United States Patent
Mitra et al.

(10) Patent No.: US 11,341,154 B2
(45) Date of Patent: May 24, 2022

(54) NORMALIZING ENCODINGS OF REQUESTED DATA FROM A COMMON DATA SCHEMA TO A TARGET DATA SCHEMA

(71) Applicant: ADOBE INC., San Jose, CA (US)

(72) Inventors: Swagatam Mitra, Bangalore (IN); Vickramaditya Dhawal, Bangalore (IN)

(73) Assignee: Adobe Inc., San Jose, CA (US)

( * ) Notice: Subject to any disclaimer, the term of this patent is extended or adjusted under 35 U.S.C. 154(b) by 283 days.

(21) Appl. No.: 16/546,120

(22) Filed: Aug. 20, 2019

(65) Prior Publication Data

US 2021/0056118 A1    Feb. 25, 2021

(51) Int. Cl.
| | |
|---|---|
| *G06F 16/00* | (2019.01) |
| *G06F 16/25* | (2019.01) |
| *G06F 9/54* | (2006.01) |
| *G06F 16/21* | (2019.01) |
| *G06F 40/211* | (2020.01) |

(52) U.S. Cl.
CPC ........... *G06F 16/258* (2019.01); *G06F 9/548* (2013.01); *G06F 16/213* (2019.01); *G06F 40/211* (2020.01)

(58) Field of Classification Search
None
See application file for complete search history.

(56) References Cited

U.S. PATENT DOCUMENTS

| | | | |
|---|---|---|---|
| 7,574,652 B2* | 8/2009 | Lennon | G06F 16/258 715/248 |
| 7,831,968 B1* | 11/2010 | Weathersby | G06F 8/60 717/174 |
| 8,417,926 B2* | 4/2013 | DeHaan | G06F 8/60 713/1 |
| 9,916,206 B2* | 3/2018 | Dornquast | G06F 16/1844 |
| 10,652,300 B1* | 5/2020 | Simukka | H04N 21/2668 |
| 10,678,810 B2* | 6/2020 | Rehal | G06F 16/2428 |
| 10,831,726 B2* | 11/2020 | Soza | G06F 16/25 |

(Continued)

OTHER PUBLICATIONS

Sookocheff, Kevin, "Understanding API Gateway Payload Mappings," Published Oct. 21, 2016. Retrieved from the Internet Nov. 19, 2019 at <https://sookocheff.com/post/api/understanding-api-gateway-payload-mappings/>. 6 pages.

(Continued)

*Primary Examiner* — Jean M Corrielus
(74) *Attorney, Agent, or Firm* — Shook, Hardy & Bacon L.L.P.

(57) ABSTRACT

Information systems provide forwards and backwards compatibility when servicing a client's request for data (RFD) via a client interface. The requested data is stored in a native version of a source data schema, and is transformed into an encoding in a version of a target data schema and provided to the client. The systems are enabled to gracefully, transparently, and in real-time service an RFD of any existing version (e.g., previous or current) of the client interface. The requested data may be stored via one or more versions (e.g., previous or current) of a combination of one or more source data schemas. Furthermore, the various embodiments are enabled to provide the requested data encoded in any supported version of the existing target data schemas.

19 Claims, 8 Drawing Sheets

(56) References Cited

U.S. PATENT DOCUMENTS

| | | | |
|---|---|---|---|
| 10,983,967 B2* | 4/2021 | Tsirogiannis | G06F 16/22 |
| 2004/0015783 A1* | 1/2004 | Lennon | G06F 16/242 |
| | | | 715/235 |
| 2010/0250907 A1* | 9/2010 | DeHaan | G06F 8/60 |
| | | | 713/1 |
| 2010/0287221 A1* | 11/2010 | Battepati | G06F 16/122 |
| | | | 707/803 |
| 2018/0096001 A1* | 4/2018 | Soza | G06F 16/235 |
| 2018/0150528 A1* | 5/2018 | Shah | G06F 16/282 |
| 2019/0216030 A1* | 7/2019 | Myers | A01G 33/00 |
| 2019/0384836 A1* | 12/2019 | Roth | G06F 16/9024 |
| 2020/0110731 A1* | 4/2020 | Roth | G06F 16/9024 |
| 2020/0175030 A1* | 6/2020 | Natraj | G06F 16/212 |
| 2020/0349130 A1* | 11/2020 | Bracholdt | G06F 16/254 |

OTHER PUBLICATIONS

"Create Models and Mapping Templates for Request and Response Mappings," Amazon API Gateway: Developer Guide. © 2019 Amazon Web Services, Inc. Retrieved from the Internet Nov. 19, 2019 at <https://docs.aws.amazon.com/apigateway/latest/developerguide/models-mappings.html>.

* cited by examiner

```
"triggerNodeId": "$.id",
"triggerEvent": "$.gesture | 'tap'",
"action": "$.action | 'artboard-transition'",
"destination": "$.properties.destination",
"properties": {
    "transition": "$.properties.transition",
    "duration": "$.properties.duration",
    "easing": "$.properties.easing",
    "preserveScrollPosition": "$.properties.preserveScrollPosition",
    "overlayPosition": "$.properties.overlayPosition",
```

NORMALIZING ENCODINGS OF REQUESTED DATA FROM A COMMON DATA SCHEMA TO A TARGET DATA SCHEMA

BACKGROUND

Information systems are ubiquitous, and economies, industries, organizations, and individuals across the globe now rely on the seamless interoperability of such systems. A fundamental operation of these systems includes servicing requests from other systems (e.g., servicing application programming interface (API) requests). For a typical request, a client (e.g., a mobile device) provides an information system's endpoint (e.g., a web server for an e-commerce platform) with a request (e.g., data relating to a product or content). In servicing the request, the server processes the request, and provides an appropriate response to the client (e.g., by providing a requested resource or information). The client may provide such a request in the form of a function call to an application programming interface (API) for the information system. The API function returns the requested data to the client device. Typically, the data is encoded in a data schema that is expected by the client.

Information systems are typically non-static, as their functionality is frequently updated to include new features, options, and configurations. For example, the version of the API is frequently updated to include advances of the functionality of the system. Also, the structure or format of the requested data is non-static, and the encoding of the data is frequently updated to reflect evolving data standards, data types, and/or data schemas. Thus, portions of the requested data may be stored as encoded in a previous version of a data schema, while other portions are stored as encoded in a current version of the data schema. Furthermore, at any one time, numerous users may be requesting information, via function calls to various API versions. The frequent updating of the API, as well as the frequent updating of the data schema for the requested data, may result in compatibility issues. As such, the seamless interoperability of many frequently updated information systems is limited and/or difficult to test and maintain.

SUMMARY

The technology described herein is directed towards information systems that provide forwards and backwards compatibility, as the system, as well as the structure, format, and/or schema of the associated data, dynamically evolve. The systems are enabled to service a client's request for data (RFD). A received RFD may be in the form of one or more function calls to a client interface. The requestable data may be provided via one or more data schemas (or data prototypes) for the data. The client interface, as well as the data schemas, may be subject to iterative updating, via software upgrade paradigms. Thus, at any point in the evolution of a system, the client interface may be associated with a history of interface versions, including a current interface version and one or more previous interface versions. Similarly, the requestable data is associated with a history of data schema versions, including a current data schema version and one or more previous data schema versions. The various embodiments are enabled to service an RFD of any existing version (e.g., previous or current) of the client interface. The requested data may be provided via one or more versions (e.g., previous or current) of a combination of data schemas. Furthermore, the various embodiments are enabled to provide the requested data encoded in any version of the existing data schemas.

At least one embodiment includes a method for servicing requests. In the method, a request for data is received from a client. The requested data may be metadata for an image. The request may include a function call to a client interface, such as an application programming interface (API). In response to receiving the request, a version of a source data schema for the requested version is determined. A version of a target data schema for the client may be determined. The version of the target data schema may be determined based on a version of the function call, or an indication of the version included in the function call. In some embodiments, the version of the source data schema is a previous version of the source data schema and the version of the target data schema is a current version of the target data schema. In other embodiments, the version of the source data schema is a current version of the source data schema and the version of the target data schema is a previous version of the target data schema. A source configuration may be identified and/or accessed based on the determined version of the source data schema. A target template may be identified and/or accessed based on the determined version of the target data schema. The source configuration and/or target template may be included in one or more transformation configuration (e.g., JavaScript object Notation (JSON) file). The requested data, encoded in the determined version of the source data schema, may be accessed, retrieved, and received from one or more data sources. A transformation engine may be configured based on the source configuration and/or the target template. The configured transformation engine may employ a parsing expression grammar (PEG) to transform an encoding of the requested data from the version of the source data schema to a common data schema. The configured transformation engine may normalize (e.g., reorganize, restructure, transform, etc.) the encoding of the requested data from the common data schema to the determined version of the target data schema. The requested data may be provided to the client. The provided data may be encoded in the version of the target data schema.

BRIEF DESCRIPTION OF THE DRAWINGS

FIGS. 4A-4B illustrate non-limiting embodiments of transformation configurations.

DETAILED DESCRIPTION

Figure 1:
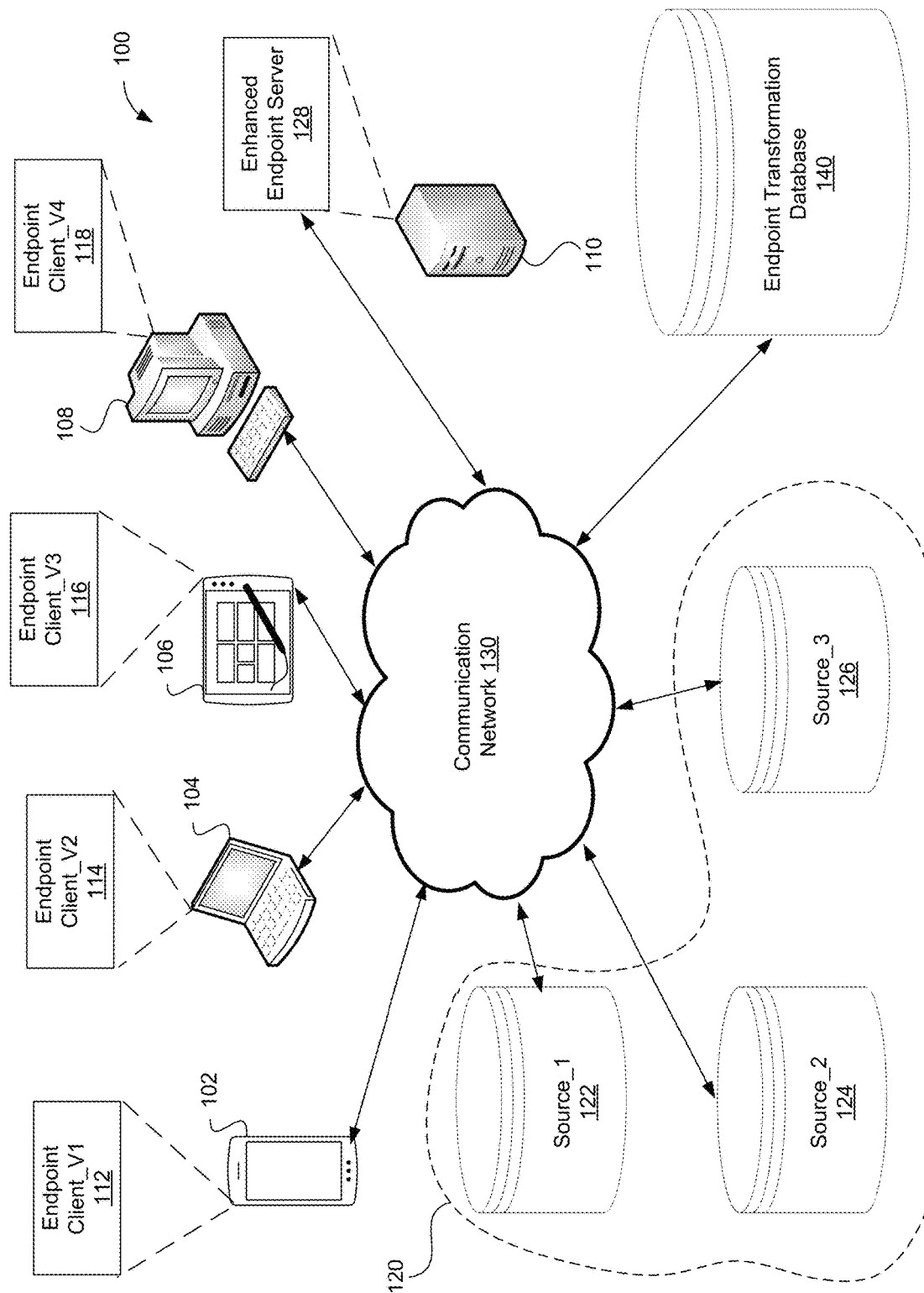
FIG. 1 illustrates an information system implementing various embodiments presented herein.

The various embodiments described herein are directed towards information systems and platforms that provide forwards and backwards compatibility, as the platforms and systems, as well as the structure, format and/or schemas of their associated data, dynamically evolve. The systems and platforms (herein collectively referred to as systems) may be information service (or retrieval) systems, in that they are enabled to service a clients' requests for data (RFD). A request may be in the form of one or more function calls to a client interface (e.g., an application programming interface or API) for an endpoint (e.g., a server) of the system. The response to a request (e.g., status information, responsive information, data) may be encoded, structured, formatted, and/or stored via one or more data schemas (or data prototypes) for the data. The client interface, as well as the data schemas, may be subject to iterative updating, via software upgrade paradigms. Thus, at any point in the evolution of a system, the client interface may be associated with a history (or hierarchy) of interface versions, including a current interface version and one or more previous interface versions. Similarly, the requestable data is associated with a history (or hierarchy) of data schema versions, including a current data schema version and one or more previous data schema versions. The various embodiments are enabled to service an RFD of any existing version (e.g., previous or current) of the client interface. The requested data may be encoded, structured, and/or stored via one or more versions (e.g., previous or current) of a combination of data schemas. Furthermore, the various embodiments are enabled to provide the requested data encoded in any version of the existing data schemas, and the RFD (or the version of the client interface employed when providing the RFD) can indicate which data schema to encode the requested data.

More specifically, the various embodiments include a transformation engine that, in response to receiving a RFD from a client, retrieves (or accesses) the requested data. The requested data may be stored in a data source and be encoded, stored, and/or structured via any existing and/or supported version of a data schema that is native to the requested data (e.g., the data's source version data schema). The transformation engine parses and transforms the retrieved data from its source version data schema to a common data schema. The common data schema serves as a hybrid data schema that allows data to be mapped across multiple data sources across multiple versions. Once in the common data schema, the transformation engine then normalizes the data from the common data schema to the version of the data schema indicated by the RFD (i.e., the target version of the data schema). The data is provided to the requesting client in the target version of the data schema. As discussed below, for each received RFD, the transformation engine may be configured to provide backwards and forwards compatibility for the RFD via modular and maintainable source configurations and target templates.

Furthermore, the user is not required to have any special knowledge about client interface versions and/or data schema versions that they are not explicitly invoking by client interface function calls. The user need not modify their use of the client interface to invoke the backwards and forward compatibility. For example, a user may continue to use an older schema and request data stored natively in an entirely different schema. As another example, a user may continue to employ an older (e.g., previous) version of the client interface to request newer data stored natively in a newer (e.g., current) version of the data schema that may be different than an older version of the data schema that is compatible with and/or expected by the older version of the client interface. The embodiments will provide the newer requested data (which is stored in the newer version of the data schema) to the client and encoded in the older version of the data schema. The user does not have to modify their older version of the function call, and/or need knowledge of the newer versions of the client interface and/or data schemas, to invoke this backwards compatibility. Similarly, the user may employ a newer version of the client interface to request older data stored natively in an older version of the data schema. The newer version of the client interface may expect the requested data in a newer version of the data schema that is different from the older version of the data schema. The embodiments will provide the requested data (stored in an older version of the data schema) to the client and encoded in the newer version of the data schema. The user does not have to modify their newer version of the function call, and/or need knowledge of the older versions of the client interface and/or data schemas, to invoke this forwards compatibility.

In some embodiments, the data may be retrieved from a plurality of data sources, wherein separate portions of the retrieved data may be encoded in separate data schemas and/or separate versions of the data schemas. The data sources may be virtualized data sources (e.g., cloud-based data storage systems). Whether encoded via a single or multiple versions of one or more data schemas of one or more data sources, the transformation engine is configured, via one or more predefined transformation configurations to retrieve, parse, and transform the data from its source versions of the data schemas to a common data schema. Upon being transformed, the requested data is normalized from the common schema to the target version of the data schema, via a predefined target template selected based on the target version of the data schema. As noted throughout, the target version of the data schema may be indicated by the RFD, or the version of the client interface employed by the client when providing the RFD. That is, via the transformation engine and the source configurations/target templates, the embodiments provide backwards and forwards compatibility between and amongst the various client interface versions and between and amongst the various data schema versions. Furthermore, even as the number of versions of the client interface and the data schemas continue to increase, the target templates are modular and straightforward to generate, test, and maintain.

The various embodiments enable a client to provide an RFD via any version of the client interface, such as the current version or a previous version of the client interface. The requested data may be stored in one or more data sources, and structured in any combination of one or more versions of data schemas. The requested data may be accessed and/or parsed, via each of the applicable data schemas, and transformed into a data schema compatible and/or consistent with the version of the client interface employed by the client. Thus, the embodiments provide backwards and forwards compatibility, with respect to the version of the client interface, as well as with respect to the various versions of the data schemas that are native to the requested data. Regardless of the data schemas that are native to the requested data, the data is provided to the client, encoded and/or structured via a data schema of the client's selecting (or identified via the particular version of the client interface that was employed in when providing the function call).

Conventional methods of providing version compatibility for information systems include developing, testing, and maintaining a monolithic data parser and aggregator, via brute force manual coding and testing by a developer. Such brute force conventional methods require significant labor in generating, updating, testing, and maintaining the code. Furthermore, the code may be integrated into the code of an endpoint or information server of the system. Integrating such frequently updated code into the system code has the potential to "break" or at least interfere with the operations of the server. As newer versions of the client interface and/or the data schemas are developed and deployed, updating and maintaining both backwards and forwards compatibility, via conventional methods, requires manual updating and testing for each possible combination of client interface version and data schema versions. As the number of possible version combinations proliferates, updating, testing, and maintaining the code quickly becomes difficult and/or cumbersome. Furthermore, these conventional methods may be subject to "code bloat" associated with frequent updating of legacy systems.

To demonstrate the difficulty of providing version compatibility via conventional brute-force methods, consider a simple scenario of proliferating client interface-data schema version combinations, where M versions of the client interface exist and the data is stored at a single data source, encoded in a single data schema that includes N versions. To further simplify the scenario, the requested data is provided via a version of the data schema that is determined by the version of the client interface that the client employed when submitting the RFD. A conventional monolithic data parser and aggregator is required to handle M×N possible interface/schema version combinations. In a scenario where the client can indicate the server should return the requested data in any of the possible N data schemas, then the conventional parser and aggregator is required to handle M×N$^2$ possible interface/schema version combinations because the "growth" of the possible version combinations increases as more data sources and more data schemas are considered. In conventional systems, each possible version combination requires manual coding, robust testing, and maintaining. Thus, each version combination added to the conventional parser and aggregator has the potential to disrupt the system's ability to service RFDs, or at least introduce bugs into the system. Such conventional parsers and aggregators have the potential to render the information system breakable, or at least "brittle," and the stability of frequently upgraded systems is compromised under such conventional methods.

The various embodiments herein overcome these and other limitations of conventional attempts to provide backwards and forwards compatibility, with respect to client interface/data schema versions, via a transformation engine. For each received RFD, the transformation engine may be configured for the versions of the data schemas that are relevant to the source data, via predetermined source configurations. The transformation engine may encode and/or structure the data in any available version of a data schema, via a predetermined target template for the version of the data schema. The source configurations and the target templates are completely modular, and are straightforward to generate, test, and maintain. As such, the forwards and backwards compatibility can easily and simply be maintained long after the development and significantly different versions of the client interface and the various data schemas.

In addition to providing forwards and backwards compatibility that is transparent to the client, the modularity of the source configurations and the target templates provides several improvements over conventional brute-force methods of attempting to provide version compatibility in information systems. For example, any effects associated with the introduction of new versions of the client interface and/or a data schema are isolated to responses to RFDs that invoke that particular combination of versions. Because the code for the operation of the endpoint is not modified when introducing new source configurations and/or new target templates for new versions of the client interface and/or new versions of a data schema, any effects with respect to the introduction of new versions will only affect requests for data that correspond to the new source configuration and/or the new target template. Compatibility testing for new client interface and/or data schemas is simplified because the new source configurations and/or target templates may be tested independently and separately, rather than testing the operation of the entire updated code for the new source configuration and target template, from a systems level. Because the systems are backwards compatible, older versions of the client interface and/or data schemas may be continually supported without significant maintenance efforts. Because the systems are forwards compatible, existing clients need not upgrade to newer versions of the client interface and/or data schemas and can continue to utilize previous versions without altering their workflow.

Moreover, because embodiments of the present invention utilize a common data schema, an encoding of requested data may be transformed from a version of the source data schema to a common data schema before being transformed into a specified version of the target data schema. The use of the common data schema ensures that the possible version combinations is M+N possible combinations because only one source version and only one target version are selected. As a result, the use of a common data schema increases the computational efficiency of systems mapping source data schemas to target data schemas.

For the discussion of the various embodiments, the client interface may be an application programming interface (API). However, the embodiments are not so limited and the client interface may be any client interface. In some embodiments, the API may be a metadata API that returns metadata for a document, such as but not limited to an image, of interest. In various non-limiting embodiments, the data schemas may be defined via JavaScript Object Notation (JSON) file format. As such, the data schemas may be structured and/or encoded in JSON files, and the exchanged data may include one or more JavaScript objects. As such, in various non-limiting embodiments, the source version configurations may be encoded in one or more transformation configuration files that are JSON files. Similarly, the target templates may be encoded in one or more transformation configuration files that are JSON files. As another example, the source configurations and the target templates may be generated and encoded together in one or transformation configuration files.

As an example of a non-limiting embodiment, consider an API that includes at least three released versions notated by: API_V1, API_V2, and API_V3. Each version of the API may include a function for requesting metadata for a document (e.g., RFD_V1, RFD_V2, and RFD_V3). In the various embodiments, calls from each of RFD_V1, RFD_V2, and RFD_V3 are supported. The requestable metadata may be distributed amongst at least two data sources notated by: S1 and S2. For example, S1 may be a first data source that stores metadata relating to an editing history of the documents, while S2 may be a data source that stores metadata relating to an author of the document. Older data stored in S1 may be encoded in a first (or previous) version of a first source data schema (S1_V1), while newer data stored in S1 may be encoded in a second (or current) version of the first source data schema (S1_V2) Likewise, older data stored in S2 may be encoded in a first (or previous) version of a second source data schema (S2_V1), while newer data stored in S2 may be encoded in a second (or current) version of the second source data schema (S2_V2)

In response to calls of each of RFD_V1, RFD_V2, and RFD_V3, the various embodiments are enabled to aggregate the requested data from each of the multiple data sources and package the aggregated data to return as one or more data objects or otherwise structured data. The requested data may be returned in a target (or third) data schema. In the various embodiments, at least portions of the first source data schema and at least portions of the second source data schema may be mapped to the target data schema. At least three versions of the target schema may exists, as indicated by: T_V1, T_V2, and T_V3. In some embodiments, RFD_V1 calls return the requested data in the first (i.e., T_V1) version of the target data schema, RFD_V2 calls return the requested data in the in the second (i.e., T_V2) version of the target data schema, and RFD_V3 calls return the requested data in the in the third (i.e., T_V3) version of the target data schema. In other embodiments, RFD_V3 may be enabled to additionally return data in each of the T_V1 and T_V2 data schemas, while RFD_V2 may be enabled to additionally return data in the T_V2 data schema. In still other embodiments, each of RFD_V1, RFD_V2, and RFD_V3 may be enabled to return data in each of the T_V1, T_V2, and T_V3 data schemas, where the client may indicate which version of the target data schema to encode the returned data, via a flag or parameter in the function call.

In a first scenario, a client requests data stored in both the first and second data sources. The requested data stored in S1 is encoded in the S1_V1 version of the first source data schema and the requested data stored in the S2 is encoded in the S1_V1 version of the second source data schema. In a second scenario, the client requests data stored in both S1 and S2, where the requested data stored in S1 is encoded in the S1_V2 version of the first source data schema and the requested data stored in S2 is encoded in the S2_V2 version of the second source data schema. In a third scenario, the client requests data stored in both S1 and S2, where the requested data stored in S1 is encoded in the S1_V1 version of the first source data schema and the requested data stored in S2 is encoded in the S2_V2 version of the second source data schema. In a fourth scenario, the client requests data stored in both S1 and S2, where the requested data stored in S1 is encoded in the S1_V2 version of the first source data schema and the requested data stored in S2 is encoded in the S2_V1 version of the second source data schema.

As will be discussed throughout, the various embodiments enable a RFD_V1 call to provide a response to each of the above four scenarios. Accordingly, the embodiments provide forwards compatibility. Likewise, the various embodiments enable calls from each of RFD_V2 and RFD_V3 to provide a response to each of the above four scenarios. Thus, the embodiments provide backwards compatibility.

Information System with Forwards and Backwards Compatibility

FIG. 1 illustrates an information system 100 implementing various embodiments presented herein. Information system 100 provides forwards and backwards compatibility for information requests from clients. Information system 100 includes one or more various client computing devices, such as but not limited to mobile computing device 102, laptop computing device 104, tablet computing device 106, and desktop computing device 108. System 100 may additionally include a server computing device 110. Various embodiments of a computing device, such as but not limited to computing devices 102-110 are discussed in the context of computing device 700 of FIG. 7. Computing devices 102-110 may be communicatively coupled via communication network 130. As discussed below, server computing device 110 may implement an endpoint server 128. Thus, server computing device 110 may be an endpoint server and/or an endpoint of system 100. Each of client computing devices 102-108 may implement one or more versions of an endpoint client. For example, first client device 102 may implement a first version of the client endpoint: endpoint client_V1 112 and second client device 104 may implement a second version of the client endpoint: endpoint client_V2 114. Likewise, third client device 106 may implement a third version of the client endpoint: endpoint client_V3 116 and fourth client device 108 may implement a fourth version of the client endpoint: endpoint client_V4 118.

The endpoint server 128 may support each of the various versions of the endpoint client, and provides information services to client computing devices 102-108, via client interface function calls from corresponding endpoint clients 112-118. Thus, endpoint server 128 may be a server for any of the various versions of the endpoint client, such as but not limited to endpoint clients 112-118. Endpoint server 128 may be an information server that serves a request for data (RFD) from any of client computing devices 102-108, which are running any version of the endpoint client. Endpoint server 128 may include a server for a client interface, such as but not limited to an application programming interface (API). Various embodiments of a server for a client interface are discussed in conjunction with at least client interface server 202 of FIG. 2. However, briefly, a client interface server may be enabled to receive function calls from any version of the endpoint client. The received function calls may include one or more RFDs from any of the various versions of the endpoint client. The client interface may provide the requested data to the endpoint client in any version of one or more data schemas supported by any version of the client interface.

Figure 2:
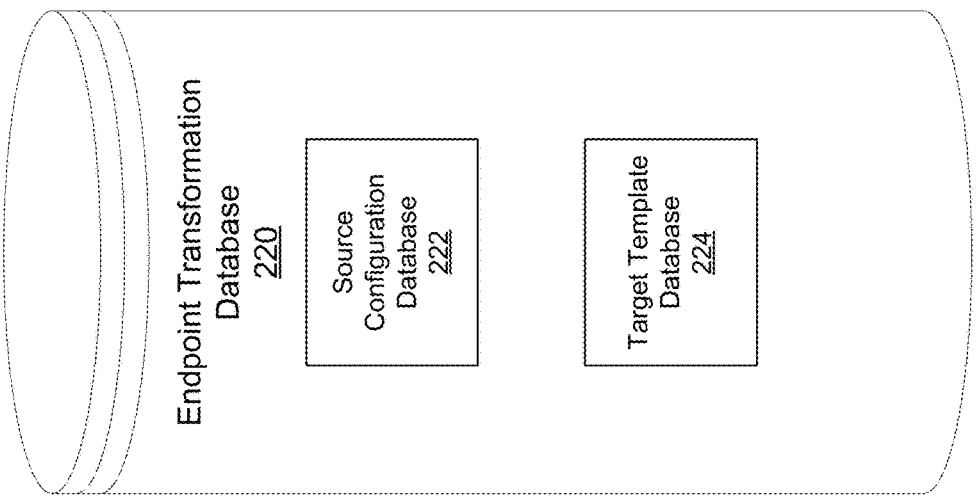
FIG. 2 illustrates an endpoint server and an endpoint transformation database that are employed to provide forwards and backwards compatibility for an information system, in accordance with the various embodiments.
Figure 2:
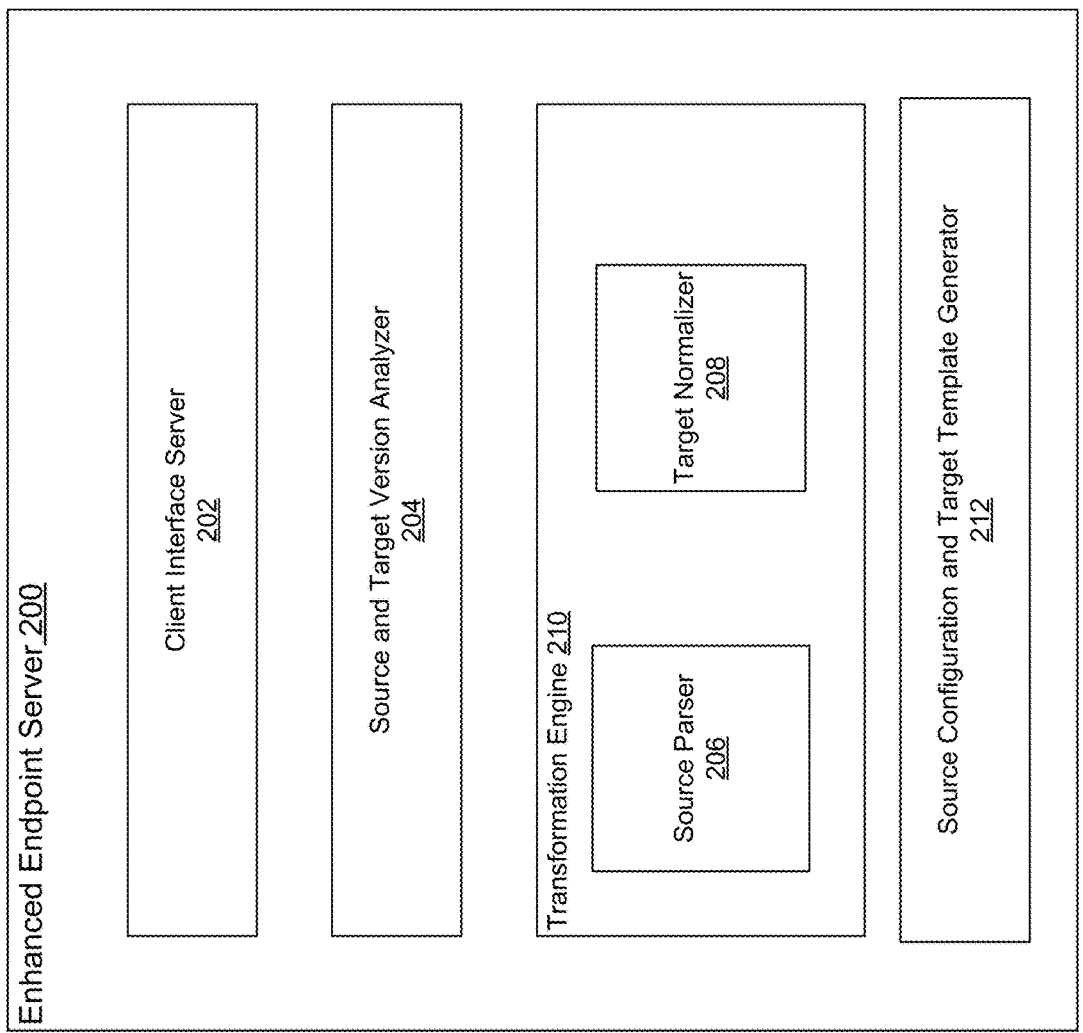

Various embodiments of an endpoint server are discussed in conjunction with endpoint server 200 of FIG. 2. However, briefly here, endpoint server 128 may include a transformation engine, such as but not limited to transformation engine 210 of FIG. 2. As discussed throughout, the transformation engine provides forwards and backwards compatibility between any of the various versions of the client interface and any version of data schemas supported by the client interface. System 100 may also include one or more databases, such as but not limited to endpoint transformation database 140. Any of the one or more databases, including but not limited to endpoint transformation database 140 may be communicatively coupled to any of computing devices, such as but not limited to server computing device 110 and client computing devices 102-108, via communication network 130. Various embodiments of endpoint transformation database 140 are discussed at least in conjunction with endpoint transformation database 220 of FIG. 2. Note that endpoint transformation database 140 and/or endpoint transformation 220 need not be an actual database, but could be virtually any content repository. However, briefly here, endpoint transformation database 140 may store one or more source configurations for the transformation engine and one or more target templates for the transformation engine. As discussed throughout, the transformation engine employs the source configurations and target templates to provide backwards and forwards compatibility, which is transparent and seamless between an end user, where the compatibilities are between and amongst any and all of the various versions of the client interface and any of the various supported versions of data schemas.

System 100 may include one or more data storage services 120. A data storage service may include one or more data sources. At least a portion of the one or more data sources may include one or more virtualized and/or cloud-based data sources. Thus, at least a portion of data storage services 120 may be virtualized and/or cloud-based storage services. In some embodiments data storage services 120 and/or its data sources may be distributed storage services and/or distributed data sources. In the embodiment shown in FIG. 1, data storage service 120 includes three data sources: source_1 122, source_2 124, and source_3 126. The embodiment shown in FIG. 1 is non-limiting, and other embodiments may include fewer or more than three data sources. Each data source may encode and/or store its data in one or more data schemas. Each of the one or more data schemas may include multiple versions.

In a non-limiting example, source_1 122 stores a first dataset in a first data schema (S1), under three iterative versions: S1_V1, S1_V2, and S1_V3. That is, a first portion of the data stored in source_1 122 is encoded in S1_V1, a second portion of the data stored in source_1 122 is encoded in S1_V2, and a third portion of the data stored in source_1 122 is encoded in S1_V3. Source_2 124 stores a second dataset in a second data schema (S2), under three iterative versions: S2_V1, S2_V2, and S2_V3. A first portion of the data stored in source_2 124 is encoded in S2_V1, a second portion of the data stored in source_2 124 is encoded in S2_V2, and a third portion of the data stored in source_2 124 is encoded in S2_V3. Source_3 126 stores a third dataset in a third data schema (S3), under three iterative versions: S3_V1, S3_V2, and S3_V3. A first portion of the data stored in source_3 126 is encoded in S3_V1, a second portion of the data stored in source_3 126 is encoded in S3_V2, and a third portion of the data stored in source_3 126 is encoded in S3_V3.

Any of endpoint clients 112-118 may provide endpoint server 128 with one or more RFDs, via communication network 130. The requested data may be stored and/or distributed within at least a portion of data storage services 120. The endpoint server 128 may access, retrieve, and/or be provided the requested data from storage services 120. In some embodiments, the requested data is stored within one of source_1 122, source_2 124, or source_3 126. In other embodiments, the requested data is distributed amongst any combination of two or more of source_1 122, source_2 124, or source_3 126. As such, the requested data may be encoded in any combination of S1, S2, and/or S3. Furthermore, the requested data may be encoded in any combination of the various supported versions of any of the supported data schemas.

Communication network 130 may be a general or specific communication network and may communicatively couple at least a portion of computing devices 102-110, the one or more data storage services 120, and endpoint transformation database 140. Communication network 130 may be any communication network, including virtually any wired and/or wireless communication technologies, wired and/or wireless communication protocols, and the like. Communication network 130 may be virtually any communication network that communicatively couples a plurality of computing devices and storage devices in such a way as to exchange information or data via communication network 130.

Endpoint Server with Forwards and Backwards Compatibility

FIG. 2 illustrates an endpoint server 200 and an endpoint transformation database 220 that are employed to provide forwards and backwards compatibility for an information system, in accordance with the various embodiments. The information system that endpoint server 200 provides forwards and backwards compatibility may be system 100 of FIG. 1. As such, endpoint server 128 of FIG. 1 may be an embodiment of, or at least similar to, endpoint server 200. Endpoint transformation database 140 may be an embodiment of, or at least similar to, endpoint transformation database 220. Note that endpoint transformation database 140 and/or endpoint transformation 220 need not be an actual database, but could be virtually any content repository. Endpoint server 200 may include one or more of a client interface server 202, a source and target version analyzer 204, a transformation engine 210, and a source configuration and target template generator 212. Endpoint transformation database 220 may include a source configuration database 222 and a target template database 224.

Figure 3:
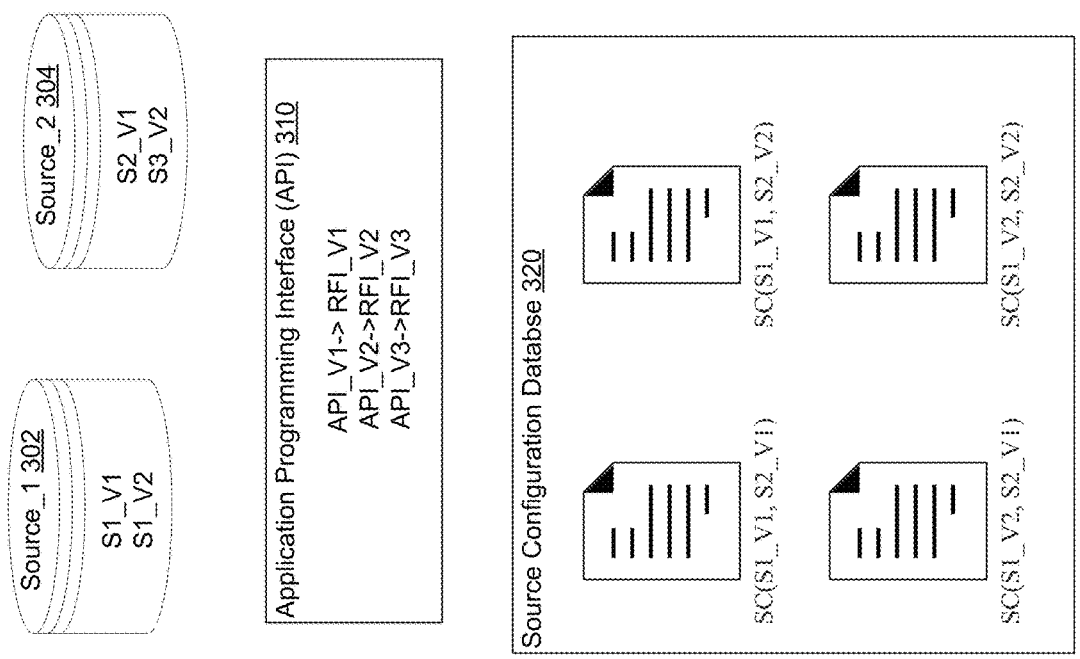
FIG. 3 graphically indicates the forwards and backwards compatibility provided by an endpoint server, in accordance with the various embodiments
Figure 3:
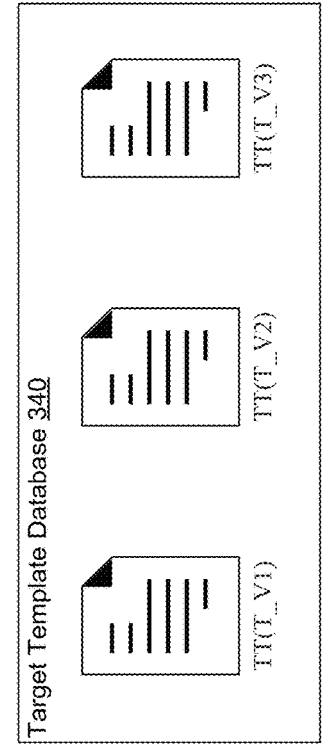
Figure 5:
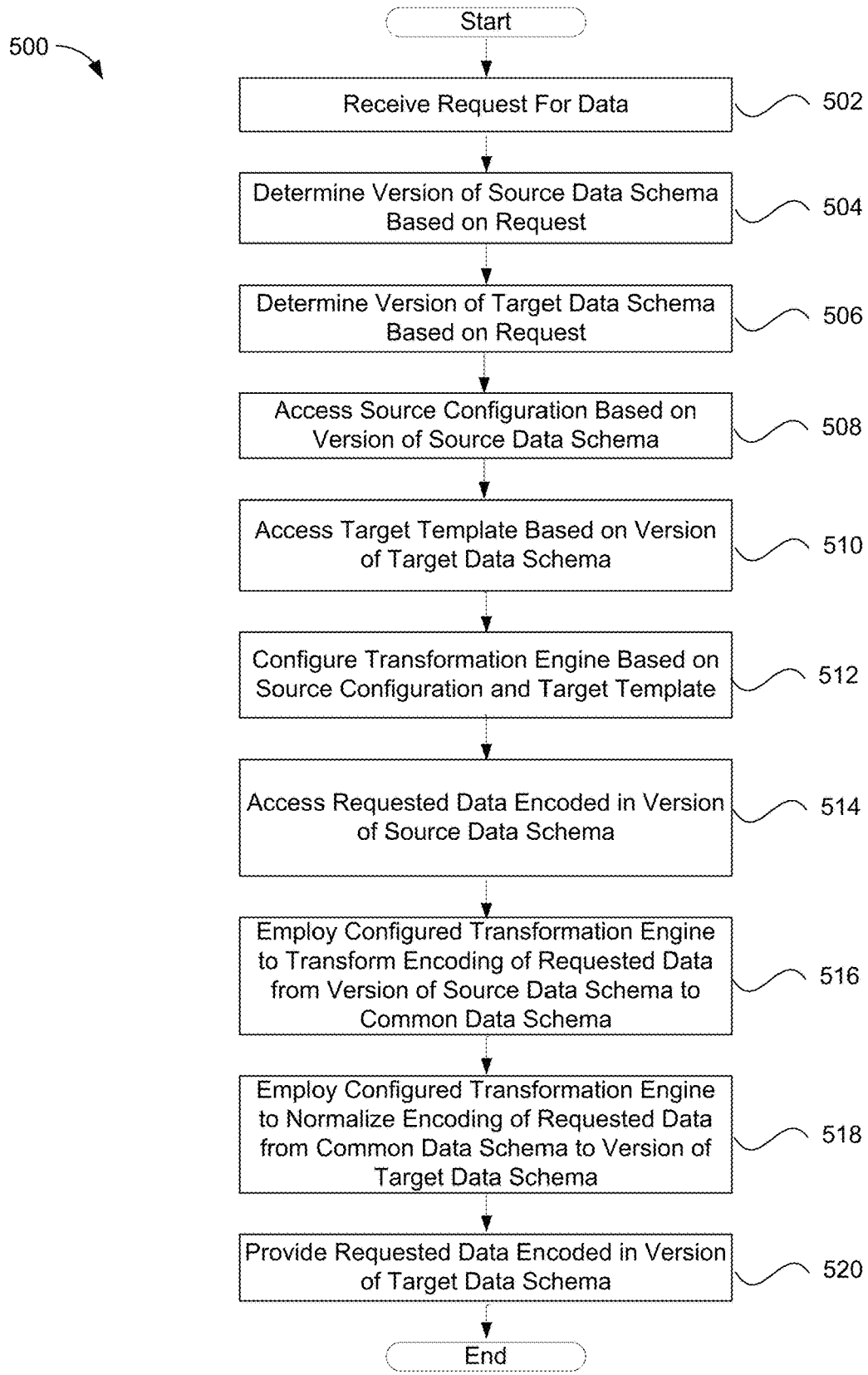
FIG. 5 illustrates one embodiment of a process for providing forwards and backwards compatibility for information systems, which is consistent with the various embodiments presented herein.
Figure 6:
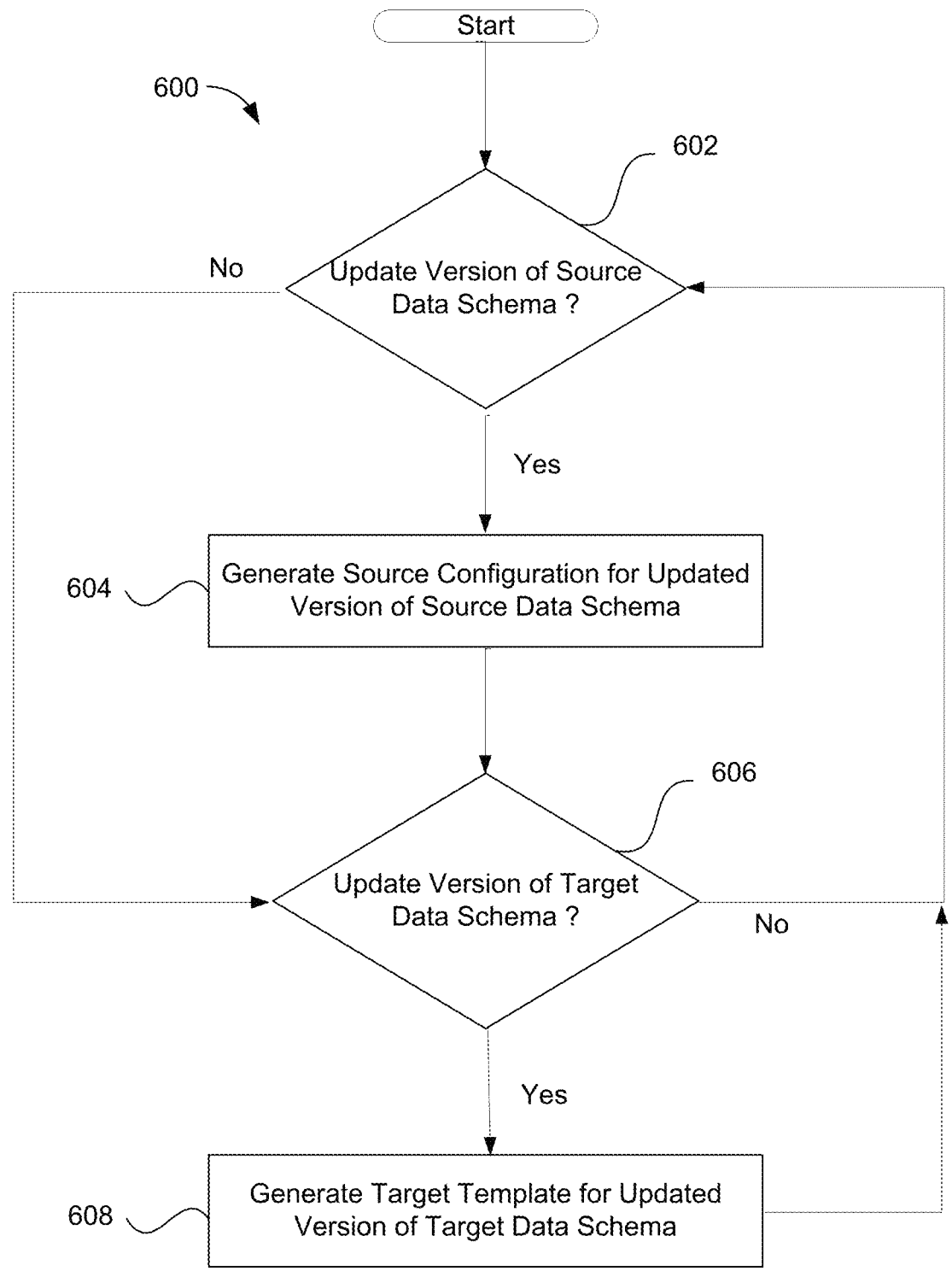
FIG. 6 illustrates one embodiment of a process for updating a system that provides forwards and backward compatibility, which is consistent with the various embodiments presented herein.

Various operations, features, and/or functionality of endpoint server 200 are described in conjunction with at least FIGS. 3 and 4A-4B, as well as processes 500 and 600 of FIGS. 5 and 6 respectively. However, briefly here, endpoint server 200 may receive a request for data (RFD). Endpoint server 200 provides the requested data or data to the sender of the RFD (e.g., a client computing device such as but not limited to client computing devices 102-108 of FIG. 1). In particular, source configuration database 222 stores source configurations that, in response to receiving a RFD, are employed to configure the transformation engine 210, such that the transformation engine 210 is configured to transform the requested data from an encoding in a version of a source data schema to an encoding in a common data schema. Target template database 224 stores target templates that enable the transformation engine 210 to normalize the encoding of the requested data from the common data schema to a version of a target data schema, which may be indicated by the RFD.

Client interface server 202 is generally responsible for receiving and providing responses to requests from clients, such as but not limited to endpoint clients 112-118 of FIG. 1. A client request may include a RFD. In various embodiments, the client server interface 204 may be a server for an application programming interface (API). Thus, client interface server 202 may be an API server. The requested data may be stored and/or distributed within a one or more data storage services, including but not limited to data storage service 120 of FIG. 1. The requested data may be stored and/or encoded in any combination one or more versions of one or more source data schemas.

Client interface 202 may receive a RFD via a function call of the client interface. As discussed throughout, endpoint server 200 provides forwards and backwards compatibility between and amongst any existing version of the client interface and between and amongst any existing versions of the data schemas that encode the data requested by the RFD. As such, client interface server 202 may receive the RFD, via a function call that is included and/or supported by any available version of the client interface. Client interface server 202 may provide the requested data via returning the data in response to the function call. The provided data may be encoded in any existing and/or supported version of any data schema that is supported by and/or consistent with the version of the function call provided by the client.

Source and target version analyzer 204 is generally responsible for determining the versions of the data schemas that the requested data is stored in (i.e., the version of the source data schemas), as well as determining the version of the data schema that the client expects that requested data to be encoded in (i.e., the version of the target data schema). That is, source and target version analyzer 204 determines the versions of the source data schemas, where the source data schema is the data schema that the requested data is stored and/or encoded in the data storage service. Source and target version analyzer 204 may further determine which data sources of the data storage service that store requested data. Source and target version analyzer 204 also determines the version of the target data schema to encode the data in prior to providing the requested data the client, where the target data schema is the data schema that the data will be provided in.

To determine the one or more versions of the one or more source data schemas, as well as the data sources that the request data is stored within, source and target version analyzer 204 may query the data storage service. The data storage service may provide the source and target version analyzer 204 with indications, identifications, and/or addresses (e.g., URLs and/or hyperlinks) of the relevant data sources, as well as the versions of the various source data schemas. In embodiments, the source data schema may be embedded within the source data. As such, source and target version analyzer 204 may query the data storage service to identify the source data schema embedded within the source data to determine the one or more versions of the one or more source data schemas. In other embodiments, the source data schema is stored in the metadata of the source data. As a result, the source and target version analyzer 204 may query the data storage service to identify and analyze the metadata of the source data to determine the version of the target data schema. To determine the version of the target data schema, source and target version analyzer 204 may analyze the received function call. In some embodiments, the version of the function call (or the version of the client interface that the function call invoked) determines the version of the target data schema. In other embodiments, the function call may include a flag or parameter that indicates the version of the target template. For example, the version of the target data schema may be obtained by analyzing an HTTP Accept header of a URL using a cURL request. As another example, the version of the target data schema may be obtained by requesting the version as a query parameter in a URL.

As a further example, consider a client interface that is an API that includes at least three released versions notated by: API_V1, API_V2, and API_V3. Each version of the API may include a function for requesting data (e.g., RFD_V1, RFD_V2, and RFD_V3). In the various embodiments, endpoint server 200 supports calls from each of RFD_V1, RFD_V2, and RFD_V3. The data may be stored and/or distributed within one or more of a first data source, a second data source, and/or a third source of one or more data storage services. The first data source may encode various portions of its data in one of three versions of a first source data schema, indicated by: S1_V1, S1_V2, and S1_V3. The second data source may encode various portions of its data in one of three versions of a second source data schema, indicated by: S2_V1, S2_V2, and S2_V3. The third data source may encode various portions of its data in one of three versions of a third source data schema, indicated by: S3_V1, S3_V2, and S3_V3. More specifically, a first portion of the data stored in the first data source may be stored in S1_V1, a second portion of the data stored in the first data source may be stored in S1_V2, and a third portion of the data stored in the first data source may be stored in S1_V3. A first portion of the data stored in the second data source may be stored in S2_V1, a second portion of the data stored in the second data source may be stored in S2_V2, and a third portion of the data stored in the second data source may be stored in S2_V3. A first portion of the data stored in the third data source may be stored in S3_V1, a second portion of the data stored in the third data source may be stored in S3_V2, and a third portion of the data stored in the third data source may be stored in S3_V3.

The API may support three versions of a target data schema, as indicated by: T_V1, T_V2, and T_V3. In some embodiments, the version of the RFD call indicates the version of the target data schema. For a non-limiting embodiment, a RFD_V1 call may return the requested data encoded in T_V1, a RFD_V2 call may return the requested data encoded in T_V2, and a RFD_V3 call may return the requested data encoded in T_V3. In other embodiments, each of RFD_V1, RFD_V2, and RFD_V2 may encode the requested data in any of T_V1, T_V2, and T_V3. A user may indicate which version of the target data schema to encode the requested data, via a flag or parameter of the RFD function call.

Client interface server 202 may receive a RFD, via any of RFD_V1, RFD_V2, and RFD_V3 function calls. In response to receiving a particular RFD_V1 function call, source and target analyzer 204 may determine that the requested data is stored in a single data source, and encoded in a single source data schema, and in a single version of the single source data schema (e.g., S2_V1). The source and target analyzer 204 may determine that the response to the particular RFD_V1 call is to be encoded in T_V1. In response to receiving a particular RFD_V2 function call, source and target analyzer 204 may determine the requested data is distributed amongst the second and third data sources, where the portion of the requested data stored in the second data source is stored in S2_V3 and the portion of the requested data stored in the third data source is stored in S3_V1. The source and target analyzer 204 may determine that the response to the particular RFD_V2 call is to be encoded in T_V2. In response to receiving a particular RFD_V3 function call, source and target analyzer 204 may determine the requested data is distributed amongst the first, second, and third data sources, where the portion of the requested data stored in the first data source is stored in S1_V3, the portion of the requested data stored in the second data source is stored in S2_V1, and the portion of the requested data stored in the third data source is stored in S3__V1. Based on a parameter included in the particular RFD_V3 function call, the source and target analyzer 204 may determine that the response to the particular RFD_V3 call is to be encoded in T_V1. It should be noted that these are non-limiting examples, and any combination of a version of a function call, versions of source data schemas, and any version of the target data schema is possible.

Transformation engine 210 is generally responsible for accessing, receiving, and/or retrieving the requested data (in its native versions of the source data schemas) and encoding the requested data in the version of the target data schema, as determined by source and target version analyzer 204. As discussed below, source configurations stored in source configuration database 222 may be employed to configure transformation engine 210 to parse and/or transform the requested data encoded in the determined version of the source data schema to a common schema. In the various embodiments, source configuration database 222 may store a source configuration for each possible combination of various versions of one or more source data schemas. For example, to service the above particular RFD_V1 function call, source configuration database 222 may store a first source configuration for S2_V1, indicated by SC(S2_V1). To service the above particular RFD_V2 function call, source configuration database 222 may store a second source configuration for the combination of versions of data schemas: S2_V3 and S3_V1, indicated by SC(S2_V3, S3_V1). Likewise, to service the above particular, source configuration database 222 may store a third source configuration for the combination of versions of data schemas: S1_V3, S2_V1, and S3_V1, indicated by SC(S1_V3, S2_V1, S3_V1). Source configuration database 222 may store a source configuration for each relevant combinations of versions of source data schemas. A source configuration may be stored in a corresponding source configuration file and/or source data structure. As shown in FIGS. 4A-4B, in various non-limiting embodiments, a source configuration may be encoded in a JSON file and/or a JSON data structure. Transformation engine 210 may employ and/or implement a parse expression grammar (PEG) to parse and/or transform the encoding of the requested data.

Transformation engine 210 may employ a target template stored in target template database 224. The target template configures the transformation engine 210 to normalize the requested data from the common schema to the determined version of the target data schema. In the various embodiments, target template database 224 may store a target template for each existing version of each existing target template. For example, target template database 224 may store three target templates, one for each of the three versions of the target data schema, as indicated by: TT(T_V1), TT(T_V2), and TT(T_V3). A target template may be stored in a corresponding target template file and/or target template data structure. Similar to a source configuration file, in various non-limiting embodiments, a target template may be encoded in a JSON file and/or a JSON data structure. Endpoint server 200 may include a source configuration and target template generator 212 that is generally responsible for generating, maintaining, and testing the source configurations and the target templates. In embodiments, the source configuration and target template generator 212 generates, maintains, and tests the source configurations and target templates manually, automatically, or by a combination thereof. For example, a user such as a developer may manually write a source configuration file or a target template generated by source configuration and target template generator 212. As another example, source configuration and target template generator 212 may automatically generate source configurations and target templates using a set of rules or any other algorithm, process, procedure, method, or the like. As yet another example, any user capable of writing JSON, such as a developer, may manually write a transformation configuration file that contains the source configurations and target templates together in one file as shown and discussed in conjunction with FIGS. 4A and 4B.

As shown in FIG. 2, transformation engine 210 may include a source parser 206 and a target normalizer 208. The source parser is generally responsible for accessing, receiving, and/or retrieving the requested data in its native versions of the corresponding source data schemas. The source parser 206 parses the requested data from its version of the source data schema to the common data schema, via a configuration based on the corresponding source configuration. Based on the determination of the source and target analyzer 204, the transformation engine 210 and/or the source parser 206 may access or receive the corresponding source configuration. In some embodiments, the source configuration may be accessed or received as part of a transformation configuration. The source parser 206 employs the source configuration to parse the requested data and/or encode the requested data in the common data schema. Source parser 206 may employ and/or implement a PEG to carry out its operations on a transformation configuration. The PEG may be a JSON-based PEG. The target normalizer 208 encodes the requested data (encoded in the common data schema) in the version of the target data schema, as determined by the source and target version analyzer 204. Transformation engine 210 and/or target normalizer 208 may access or receive the corresponding target template. In some embodiments, the target templates may be accessed or received as part of a transformation configuration. The target template is employed to configure the target normalizer 208, such that the target normalizer 208 may normalize the requested data from its encoding in the common data schema to an encoding the expected version of the target data schema.

It should be noted that in at least one embodiment, when the version of the source data schema is older than the version of the target data schema, at least a portion of the requested may not be available because some data objects included in the newer version of the target data schema were not employed in the older version of the source data schema. In such embodiments, data associated with the new data objects may not be provided when servicing the request. In other embodiments where data corresponding to the new data objects are not available, corresponding data may be inferred via data interpolation, data extrapolation, and/or the like. In some embodiments, one or more machine learning methods may be employed to hallucinate or predict the missing data. In such embodiments, the predicted and/or inferred data may be provided when servicing the RFD.

Turning now to FIG. 3, which graphically indicates the forwards and backwards compatibility provided by an endpoint server, such as but not limited to endpoint server 128 of FIG. 1 and/or endpoint server 200 of FIG. 2. System 300 of FIG. 3 shows two data sources: source_1 302 and source_2 304. In some embodiments, source_1 302 may store document data and source_304 may store user data. For example, the document data may include images and the user data may include user profile data for the users that generated the images. Source_1 302 may store its data natively encoded in one of two versions of a first source data schema, indicated as: S1_V1 and S1_V2. Source_2 304 may store its data natively encoded in one of two versions of a first source data schema, indicated as: S2_V1 and S2_V2. In some embodiments, S1_V1 and S2_V1 may be previous versions of the respective source data schemas and S1_V2 and S2_V2 may be current versions of the respective source data schemas. Thus, older data stored in source_1 302 may be encoded in S1_V1, and more recent (or newer) data stored in source_1 302 may be encoded in S1_V2. Similarly, older data stored in source_2 304 may be encoded in S2_V1, and more recent (or newer) data stored in source_2 304 may be encoded in S2_V2.

System 300 supports API 310. API 310 may support three versions of the API: API_V1, API_V2, and API_V3. Each version of API 310 may support one of three versions of a RFD function call: RFD_V1, RFD_V2, and RFD_V3. In non-limiting embodiments, API_V1 supports RFD_V1, API_V2 supports RFD_V2, and API_V3 supports RFD_V3. In some non-limiting embodiments, API_V3/RFD_V3 may be a current version of the API, while API_V2 and API_V1 are older versions of the API. System 300 may support three versions of a target data schema: T_V1, T_V2, and T_V3. In some embodiments, T_V3 may be a new version of the target data schema and T_V2 and T_V1 are older versions of the target data schema.

Each of the three supported RFDs may be a request for data that includes a first portion stored in source_1 302 and a second portion stored in source_2 304. Each RFD call returns both portions of the requested data, encoded in any one of the three versions of the target data schema. That is, system 300 aggregates both portions of the requested data and encodes the aggregated requested data in a version of the target data schema. Via the various embodiments described herein, system 300 supports both forwards and backwards compatibility. Thus, system 300 supports RFD calls that correspond to any combination of the two versions of the first source data schema, of the two versions of the second source data schema, of the three versions of the three target data schemas, and the three versions of the target data schema.

To enable the forwards and backwards compatibility, system 300 includes a source configuration database 320 and a target template database 340. Source configuration database 222 of FIG. 2 may be an embodiment of, or at least similar to, source configuration database 320. Target template database 224 may be an embodiment of, or at least similar to, target template database 340. To support each of the possible four combinations of the first and the second source data schemas, source configuration database 222 stores four source configuration files, indicated as: SC(S1_V1, S2_V1), SC(S1_V1, S2_V2), SC(S1_V2, S2_V1), and SC(S1_V2, S2_V2). To support the three versions of the target data schema, target template database 340 may store three target templates, as indicated by: TT(T_V1), TT(T_V2), and TT(T_V3). Although not shown for clarity, in embodiments, the source configurations in the source configuration files and corresponding target data schemas in the target templates can be combined into one transformation configuration file.

Serviceable data requests 350 show 12 of the 3×2×2× 3=36 possible RFD calls, where the first argument of the RFD call indicates the version of the first source data schema, the second argument indicates the version of the second source data schema, and the third argument indicates the version of the target data schema. Note, for the 12 RFD calls shown in serviceable data requests 350, the version of the RFD function call is equivalent to the version target data schema. In some embodiments, only these 12 possible RFDs are supported because the version of the RFD call indicates, or at least implies, the version of the target template. In other embodiments, all 36 possible RFDs are supported, where the version of the target template may be included as a flag or parameter in the function call. To service each of the supported RFD calls, the corresponding source configurations and target templates are employed to configure the transformation engine.

Turning now to FIGS. 4A and 4B, FIG. 4A shows a first transformation configuration 400, that is employed to service a request for data stored in a single data source, and FIG. 4B shows a second transformation configuration 440 that is employed to service a request for data distributively stored within three data sources. Transfiguration configurations 400 and 440 are encoded in JSON and stored in JSON files. In some embodiments, the JSON code contains standard JSON statements, custom JSON statements, or any combination thereof. Additionally, in other embodiments, and as mentioned in conjunction with at least FIG. 3, a PEG is used to parse the JSON code. Accessors on the right side of the colon operator in FIGS. 4A and 4B are parsed using the PEG. The parsed JSON logic then generates a parser used to generate a tree with a plurality of nodes.

Subsequently, the transformation engine traverses the tree and evaluates the nodes of the tree on the fly to map the source data schema to the target data schema. In some embodiments, the target data schema is a common data schema that is used as an intermediate transformation before mapping the data in the common data schema to a final target data schema. In such situations, the JSON on the left side of the colon operator indicates keys which will be in the resultant target data schema and the JSON on the right side of the colon operation indicates information present in the source data schema.

In at least some embodiments, mapping from the version of the source data schema to the version of the target data schema may be accomplished in the JSON code of the transformation configuration. For example, in some embodiments, transformation configurations 400 and 440 may indicate the mapping from the version of the source data schema directly to the version of the target data schema. In such embodiments, the encoding of the requested data may be transformed from the version of the source data schema directly to the version of the target data schema, without being transformed to the common data schema, using JSON code that indicates the mapping directly without specifying a common data schema. Thus, such embodiments do not require a target normalizer or a common data schema. The mapping may be directly read from the source configuration, and only the source configuration is required to configure the transformation engine, i.e., a target template is not required.

In embodiments, transformation configuration files 400 and 440 may contain source configurations on the right side of the colon operator and target templates on the left side of the colon operator. Source configurations in source configuration files and target data schemas in the target templates may be accessed, retrieved, or received from source configuration database 320 and target template database 340 as discussed in conjunction with at least FIG. 3. For example, a source data schema on the right side of the colon may be acquired from one of the source configuration files in source configuration database 320. As another example, a target data schema on the left side of the colon may be acquired from one of the target templates in target template database 340.

In some embodiments, a separate transformation configuration, stored in any suitable format, contains an index which provides information about which transformation configuration to use. In other embodiments, a map data structure indicates the transformation configuration, the source data schema version, and the target data schema version to use. The transformation configuration file contains a source configuration as shown in FIGS. 4A and 4B and can be created manually, automatically, or any combination thereof. In embodiments, the proper transformation configuration may be determined by analyzing the file name of a transformation configuration, metadata of the file, an index, or any other suitable information in the transformation configuration file. In other embodiments, the correct transformation configuration can be determined by analyzing map data. Additionally, the target template of the transformation configuration is identified from the requested target template designated by the client. Additionally, the source configuration of the transformation configuration may be determined by analyzing the source data schema embedded within the source data or alternatively analyzing the metadata of the source data to determine the source data schema.

Transformation configuration 400 explicitly shows the mapping, correspondence, transformation, and/or parsing from the encoding of the version of the single source data schema to the common data schema. The "$" character in source configuration 400 indicates the path, URL, endpoint, and/or link to the single data source or endpoint. Thus, as shown in source configuration 400, a single line of JSON represents a map from a single source data schema to a target data schema. In FIG. 4B, transformation configuration 440 demonstrates a mapping from multiple source data schemas to a single target data schema. The "$" character indicates a global context for a first data source. "manifest" is a manifest for a second data sources and "$manifest" is a namespace for the manifest. "$interactions" is a namespace for a third data source. Source configuration 440 explicitly shows the mapping, correspondence, transformation, and/or parsing from the encoding of the data stored in 3 separate data sources, encoded in 3 separate source data schemas, to the common data schema. As a result, the 3 separate data sources can be mapped into one data source.

Generalized Processes for Providing Forwards and Backwards Compatibility

Figure 7:
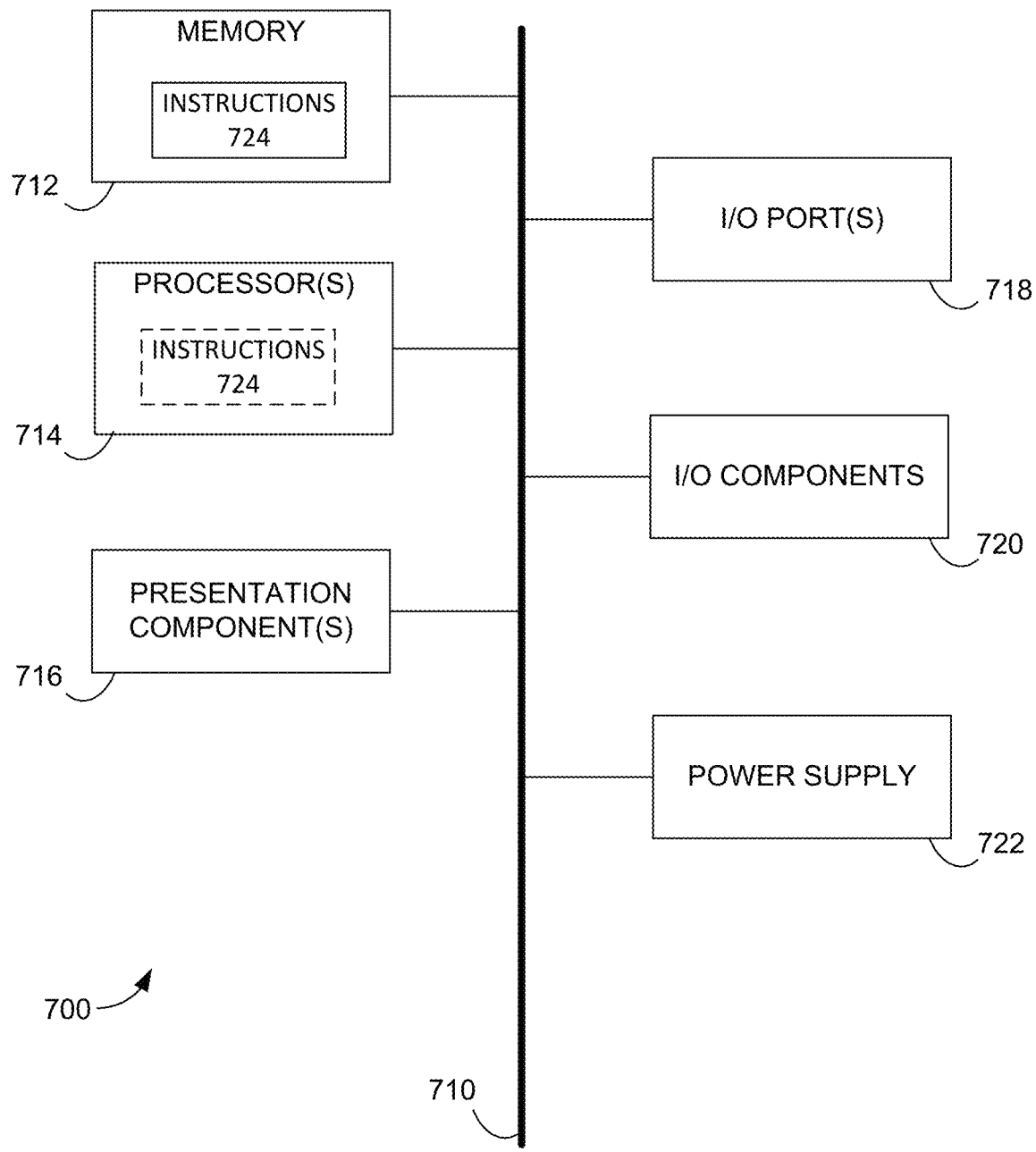
FIG. 7 is a block diagram of an example computing device in which embodiments of the present disclosure may be employed.

Process 500 of FIG. 5 and process 600 of FIG. 6, or portions thereof, may be performed and/or executed by any computing device, such as but not limited to computing devices 102-110 of FIG. 1, as well as computing device 700 of FIG. 7. Additionally, an endpoint server, such as but not limited to endpoint server 128 140 of FIG. 1 and/or endpoint sever 200 of FIG. 2, may perform and/or execute at least portions of process 500 and/or 600.

FIG. 5 illustrates one embodiment of a process 500 for providing forwards and backwards compatibility for information systems, which is consistent with the various embodiments presented herein. Process 500 starts after a start block, at block 502, where a request for data is received. The request may be a request for data (RFD). The RFD may include and/or be a function call from a client interface, such as but not limited to an application programming interface (API). As a non-limiting example, the API may include API 310 of FIG. 3. Thus, the RFD may be a function call from an API. The request may be received from and/or be provided by a client computing device, such as but not limited to any of client computing devices 102-108 of FIG. 1. In some embodiments, the request may be received from and/or be provided by an endpoint client, such as but not limited to endpoint clients 112-118. More particularly, the RFD may be provided by a client interface client implemented by the endpoint client. The request may be received at a server computing device, such has but not limited to server computing device 128. The request may be received at an endpoint server, such as but not limited to endpoint server 128 and/or endpoint server 200 of FIG. 2. More particularly, the request may be received at a client interface server implemented by an endpoint server, such as but not limited to client interface server 202 of FIG. 2.

The requested data may include a document, such as but not limited to an image document. The requested data may be for metadata of a document, such as but not limited to metadata for an image. The requested data may be stored in one or more data storage services, such as but not limited to data storage service 120 of FIG. 1. The requested data may be stored in and/or distributed amongst one or more data sources, such as but not limited to data sources 122-126 of FIG. 1 and/or data sources 302-304 of FIG. 3. The requested data may be stored and/or natively encoded in any combination of one or more versions of one or more source data schemas. For example, a first portion of the requested data may be stored in a first data source and be natively encoded in a first version of a first source data schema. A second portion of the requested data may be stored in a second data source and be natively encoded in a second version of a second source data schema. A version of the source data schema may be a current version of the source data schema. In other embodiments, the version of the source data schema may be a previous version of the source data schema. In at least one embodiment, the version of the source data schema may be a future and/or planned, but not yet implemented, version of the source data schema.

At block 504, the version of the source data schema is determined. The version of the source data schema may be determined based on the received request. For example, the version of the target data schema may be obtained by analyzing an HTTP Accept header of a URL using a cURL request. As another example, the version of the target data schema may be obtained by requesting the version as a query parameter in a URL. A source and target version analyzer, such as but not limited to source and target version analyzer 204 of FIG. 2. The determined version of the source data schema may be the version of the source data schema that that requested data is natively stored and/or encoded in. At block 506, a version of a target data schema is determined. The source and target version analyzer may determine the version of the target data schema based on the request. The determined version of the target data schema may be the version of the target data schema that the requested data will be encoded in when the requested data is provided to the client the sent the request for data. The version of the target data schema may be determined based on a version of the client interface and/or a version of the API that sent and/or received the request. For example, the version of the target data schema may be determined based on a version of the function call of the client interface and/or API. In other embodiments, the version of the target data schema may be determined based on an indication of the version of the target data schema included in the request. For example, the version of the target data schema may be determined based on a parameter or flag included in the function call such as a cURL request. The version of the target data schema may be a current version of the target data schema. In other embodiments, the version of the target data schema may be a previous version of the target data schema. In at least one embodiment, the version of the target data schema may be a future and/or planned, but not yet implemented, version of the target data schema.

At block 508, a source configuration is accessed, retrieved, and/or received based on the determined version of the source data schema. For example, source configurations may be read directly from data stored on any hard disk or virtual disk via a query or function call. In other implementation, configurations may be fetched from remote locations such as a database or any other content repository. At block 510, a target template is accessed, retrieved, and/or received based on the determined version of the target data schema. The source configuration and/or the target template may be stored in an endpoint transformation database, such as but not limited to endpoint transformation database 140 of FIG. 1 and/or endpoint transformation database 220 of FIG. 2. The source configuration may be stored in a source configuration database, such as but not limited to source configuration database 222 of FIG. 2 and/or source configuration database 320 of FIG. 3. The target template may be stored in a target template database, such as but not limited to target template database 224 of FIG. 2 and/or target template database 340 of FIG. 3. At least one of the source configuration and/or the target template may be encoded JavaScript Object Notations (JSON). At least one of the source configuration and/or the target template may be stored in one or more documents and/or files, such as but not limited to one or more transformation configuration (e.g., JSON files). Various non-limiting embodiments of a source configurations are discussed in at least conjunction with FIGS. 4A-4B. As noted above, the version of the source data schema may include one or more versions of one or more source data schemas. For example, separate portions of the requested data may be stored in separate data sources that encode the separate portions in separate versions of separate source data schemas. As such, the accessed source configuration may be based on at least a first version of a first source data schema and a second version of a second source data schema.

At block 512, a transformation engine may be configured based on at least one of the source configuration and/or target template. In at least one embodiment, configuring the transformation engine may be based on at least one of the determined version of the source data schema and/or the determined version of the target data schema. The transformation engine may be included in an endpoint server, such as but not limited to endpoint server 128 of FIG. 1 and/or endpoint server 200 of FIG. 2. In at least one embodiment, the configured transformation engine may be transformation engine 210 of FIG. 2.

At block 514, the requested data is accessed, retrieved, and received from the one or more data sources that store the requested data. The accessed requested data may be encoded in the determined versions of the one or more data schemas. Separate portions of the requested data may be received from a plurality of separate data sources. Furthermore, the separate portions of the requested data may be encoded in separate versions of separate source data schemas. The transformation engine may be enabled for, and be employed to, aggregate the separate portions of the requested data.

At block 516, the configured transformation engine is employed to transform the encoding to the requested data from the one or more versions of the one or more source data schemas to a common data schema. The common data schema serves as a hybrid data schema that allows data to be mapped across multiple data sources across multiple versions. In some embodiments, the transformation engine may parse the requested data, based on the a transformation configuration, and encode the parsed requested data in a common data schema. For example, the transformation configuration may include a parsing grammar or parsing expressions that indicate how to parse the requested data in its native version of its source data schema and encode the parsed data in the common data schema. The parsing expressions may be encoded in JSON. The transformation engine may employ and/or implement a parsing expression grammar (PEG) to transform the encoding of the requested data from the version of the source data schema to the common data schema. The PEG may be a JSON-based PEG. In some embodiments, the PEG generates a tree structure to iterate through children by analyzing the JSON logic. In other embodiments, the requested data may be parsed by a source parser, such as but not limited to source parser 206 of FIG. 2. Thus, source parse 206 may implement a PEG, such as, but not limited to, a JSON-based PEG.

At block 518, the configured transformation engine may be employed to normalize the encoding of the requested data from the common data schema to the determined version of the target data schema. The common data schema may be a unified data format of schema that is always kept up to data and is not versioned. The common data schema may be a verbose data schema, as compared to the version of the target data schema. For example, the target data schema may be paired down from the common data schema. A target normalizer, such as but not limited to target normalizer 208, may normalize the encoding of the requested data from the common data schema to the determined version of the target data schema. The source parser and the target normalizer may be operational in the same computation cycle, such that the encoding of the requested data is transformed from the version of the source data schema to the version of the target data is the same computation cycle. The transformation of the encoding of the encoding of the requested data may be a bottom-up traversal from the version of the source data schema to the version of the target data schema. The target template may indicate parsing expressions that indicate the normalization of the encoding from the common data schema to the version of the target data schema. Thus, the normalization of the encoding may be based on the target template and/or the determined version of the target data schema. The target template may include a target template table with a format that indicates a parsing from the verbose common data schema to the less verbose version of the target data schema.

At block 520, the requested data is provided to the client. The provided data may be encoded in the version of the target data schema. Thus, process 500 may provide forwards and backwards compatibility for an information system and/or platform, such as but not limited to system 100 of FIG. 1.

FIG. 6 illustrates one embodiment of an process 600 for updating an system that provides forwards and backward compatibility, which is consistent with the various embodiments presented herein. Process 600 starts after a start block, at decision block 602, where it is determined whether a version of a source data schema has been updated and/or added to the system. If the source data schema has been updated, process 600 flows to block 604. Otherwise, process 600 flows to decision block 606. At block 604, a source configuration for the updated version of the source data schema is generated. At decision block 606, it is determined whether a version of a target data schema has been updated and/or added to the system. If the target data schema has been updated, process 600 flows to block 608. Otherwise, process 600 returns to decision block 602. At block 608, a target template for the updated version of the target data schema is generated. Process 600 returns to decision block 602.

Illustrative Computing Device

Having described embodiments of the present invention, an example operating environment in which embodiments of the present invention may be implemented is described below in order to provide a general context for various aspects of the present invention. Referring to FIG. 7, an illustrative operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. Memory 712 may be non-transitory memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 700 includes one or more processors that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon for servicing requests, which, when executed by a processor of a computing device cause the computing device to perform actions comprising:
   receiving, from a client, a request for data;
   determining, based on the request, a source data schema version for the requested data and a target data schema version for the client;
   accessing a source configuration based on the determined source data schema version;
   accessing a target template based on the determined target data schema version;
   configuring a transformation engine based on the source configuration and the target template;
   employing the configured transformation engine to transform an encoding of the requested data from the source data schema version to a common data schema that provides a single intermediate data schema between the source data schema and the target data schema;
   employing the configured transformation engine to normalize the encoding of the requested data from the common data schema to the target data schema version; and
   providing the requested data to the client, wherein the provided data is encoded in the target data schema version.

2. The computer-readable storage medium of claim 1, the actions further comprising:
   accessing a first portion of the requested data from a first data source, wherein the first portion of the requested data is encoded in a first source data schema version;
   accessing a second portion of the requested data from a second data source, wherein the second portion of the requested data is encoded in a second source data schema version;
   accessing the source configuration, wherein the source configuration is based on each of the first source data schema version and the second source data schema version; and
   employing the configured transformation data to aggregate the first portion of the requested data and the second portion of the requested data.

3. The computer-readable storage medium of claim 1, wherein the source data schema version is a previous version of the source data schema and the target data schema version is a current version of the target data schema.

4. The computer-readable storage medium of claim 1, wherein the source data schema version is a current version of the source data schema and the target data schema version is a previous version of the target data schema.

5. The one or more computer-readable storage media of claim 1, wherein each of the source configuration and the target template are encoded in one or more JavaScript Object Notation (JSON) files.

6. The one or more computer-readable storage media of claim 1, wherein the request includes a function call and determining the target data schema version is further based on one or more parameters included the function call.

7. The one or more computer-readable storage media of claim 1, wherein the request includes a function call from an application programming interface (API).

8. The one or more computer-readable storage media of claim 7, wherein determining the target data schema version is further based on a version of the function call from the API.

9. The computer-readable storage medium of claim 1, wherein the transformation engine employs a parsing expression grammar (PEG) transform the encoding of the requested data from the source data schema version to the common data schema.

10. The one or more computer-readable storage media of claim 1, determining the target data schema version is further based on an indication of the target data schema version included in the request.

11. A method for servicing a request, comprising:
    determining, based on a request for data, a version of a source data schema for the requested data and a version of a target data schema for a client, wherein the request was provided by the client;
    configuring a transformation engine based on the determined version of the source data schema and the determined version of the target data schema;
    employing the configured transformation engine to transform an encoding of the requested data from the version of the source data schema to a common data schema that provides a single intermediate data schema between the source data schema and the target data schema;
    employing the configured transformation engine to normalize the encoding of the requested data from the common data schema to the version of the target data schema; and
    providing the encoding of the requested data in the version of the target data schema to the client.

12. The method for claim 11, further comprising:
    accessing a source configuration based on the determined version of the source data schema;
    accessing a target template based on the determined version of the target data schema; and
    configuring the transformation engine based on the source configuration and the target template.

13. The method of claim 11, wherein the requested data is distributed amongst a plurality of data sources and the method further comprises:
    receiving the requested data from the plurality of data sources; and
    aggregating the requested data.

14. A computing system for servicing requests, comprising:

a processor device; and a computer-readable storage medium, coupled with the processor device, having instructions stored thereon, which, when executed by the processor device, perform actions comprising:

in response to receiving a request for data from a client computing device, determining a version of a source data schema for the requested data;

configuring a transformation engine based on the version of the source data schema;

employing the configured transformation engine to transform an encoding of the requested data from the version of the source data schema to a common data schema that provides a single intermediate data schema between the source data schema and the target data schema;

employing the configured transformation engine to normalize the encoding of the requested data from the common data schema to a version of the target data schema, such; and providing the requested data to the client computing device, wherein the provided data is encoded in the version of the target data schema.

15. The computing system of claim 14, the actions further comprising:

determining the version of a target data schema based on the request;

accessing a source configuration based on the determined version of the source data schema;

accessing a target template based on the determined version of the target data schema; and employing the source configuration and the target template to configure the transformation engine.

16. The computing system of claim 14, the actions further comprising:

receiving a first portion of the requested data from a first data source, wherein the first portion of the requested data is encoded in a version of a first source data schema;

receiving a second portion of the requested data from a second data source, wherein the second portion of the requested data is encoded in a version of a second source data schema;

accessing a source configuration file based on each of the version of the first source data schema and the version of the second source data schema; and employing the source configuration file to configure the transformation engine.

17. The computing system of claim 14, wherein the transformation engine employs a JavaScript Object Notation-based parse expression grammar to parse the encoding of the requested data in the version of the source data schema.

18. The computing system of claim 14, wherein the version of the source data schema is a previous version of the source data schema and the version of the target data schema is a current version of the target data schema.

19. The computing system of claim 14, wherein the version of the source data schema is a current version of the source data schema and the version of the target data schema is a previous version of the target data schema.

* * * * *